Oct. 16, 1923.
L. T. GODFREY-EVANS
1,470,820
CARBURETOR FOR INTERNAL COMBUSTION ENGINES
Filed Feb. 9, 1921
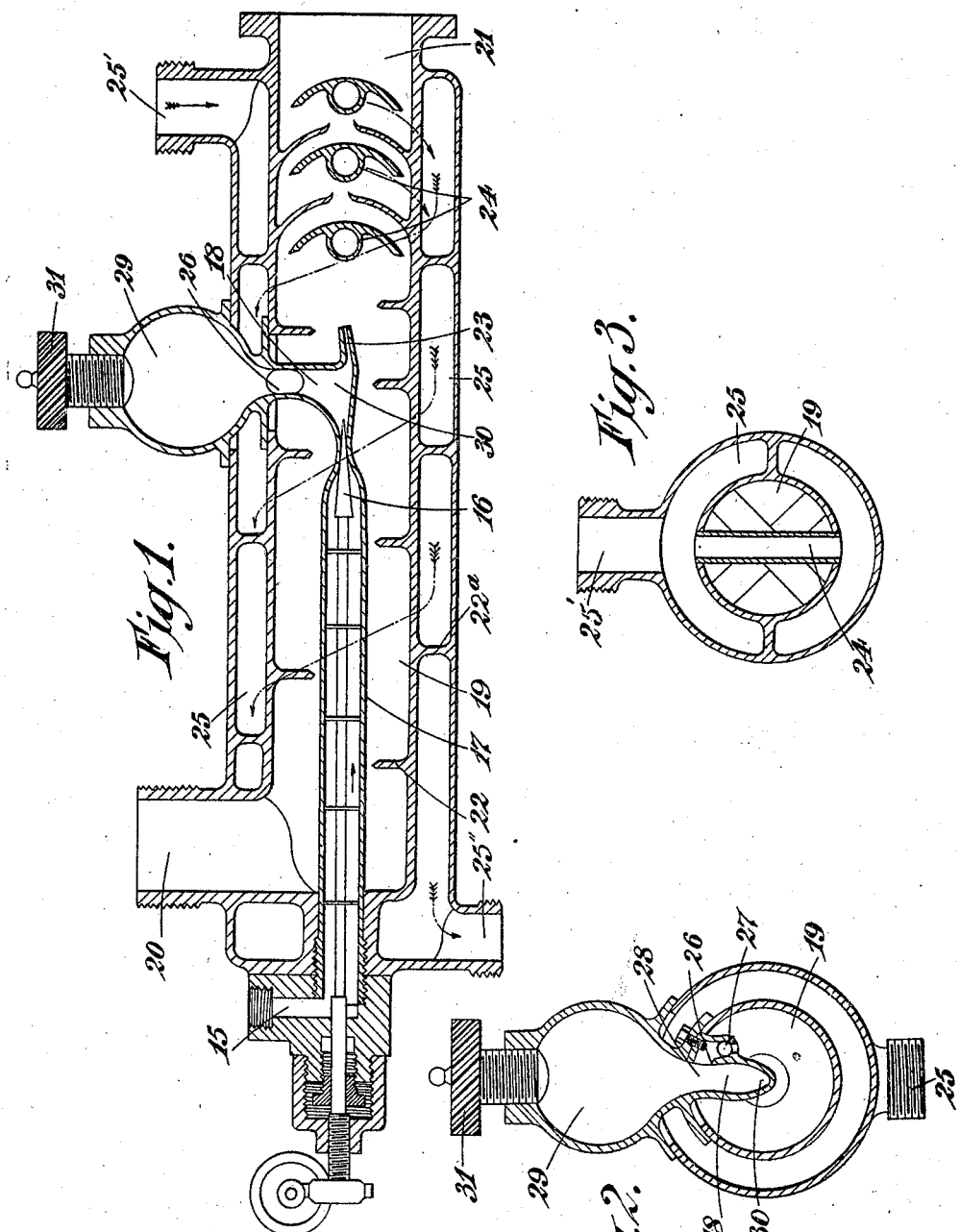
INVENTOR
L. T. GODFREY-EVANS Patented Oct. 16, 1923.

1,470,820

UNITED STATES PATENT OFFICE.

LEWIS THOMAS GODFREY-EVANS, OF WEST NORWOOD, LONDON, ENGLAND.

CARBURETOR FOR INTERNAL-COMBUSTION ENGINES.

Application filed February 9, 1921. Serial No. 443,646.

(GRANTED UNDER THE PROVISIONS OF THE ACT OF MARCH 3, 1921, 41 STAT. L., 1313.)

*To all whom it may concern:*

Be it known that I, LEWIS THOMAS GODFREY-EVANS, a subject of the King of Great Britain and Ireland, and a resident of West Norwood, county of London, England, have invented a certain new and useful Improvement in Carburetors for Internal Combustion Engines, of which the following is a specification.

This invention relates to improvements in carburetors of the injector type for internal combustion engines and is applicable to different types of such engines; for example, it might, by suitable modifications, be applied to engines operating on the induction principle, but it will be described at present more in its relation to engines of the type in which a piston serves for two working chambers, an explosion occurring in one chamber while compression occurs in the other, and for which the air is firstly compressed through the carburetor to produce a rich aerated mixture.

According to this invention, the carburetor consists of three parts, and the feed of the fuel into the carburetor is regulated by a needle valve near the end of the central tube which is one of the aforesaid parts.

The heavy or light oils or spirit will be so prepared during their progress through the carburetor that the atoms constituting the hydrocarbons will be oxygenated and heated and measured up in defined quantities and rates for delivery from the injector to the engine.

This injector type of carburetor is specially for the more exact measurement of extremely small or large quantities of spirit, oil or other kind of liquid fuel to be discharged at such rate per unit of time as may be required for any purpose, but especially for aeration prior to transformation into the gaseous state, by the application of heat which may be obtained by radiation and conduction from the exhaust gases or steam or by any other method direct or indirect—as water heated by the exhaust or by hot water from the cylinder cooling jacket.

An embodiment of the invention is shown by way of example in the accompanying drawings, wherein:—

Figure 1 is a longitudinal section of the carburetor; and,

Figures 2 and 3 are cross-sections through Figure 1.

Referring to the figures, the fuel which enters the carburetor by way of inlet 15, is regulated by the needle valve 16 near the end of the central tube 17. This central tube 17 is for heating the fuel, which is preferably brought in under pressure from a tank to which the pressure of the explosion is introduced by a pipe from the working chamber, and then passes from entrance to exit 23, where the valve 16 is fixed for controlling the rate of delivery. The tube 17 is supported at its inlet end 15 and has at the opposite end the open inlet of a regulator chamber 18, into which the oil or spirit is delivered for partial aeration and for timing more definitely the rate of delivery of the oil or spirit to the engine.

The intermediate chamber 19 in part surrounds the tube 17, the air being forced into the chamber under pressure or induced into the chamber at its outer end 20, then travelling in a circuitous course to the outlet end 21, baffles 22 being so fixed in the passage as to give an enlarged heating surface and so add heat to the fullest extent, so that the air may receive the maximum of heat before it reaches the end of the tube 17 where the oil or spirit is sprayed from the nozzle 23 to the regulator by the joint action of the air vessel and the induction at 20, the mixture being then diffused by being forced against the various angles obstructions and cross tubes, while the heat is augmented by arranging in the remaining part of the chamber cross tubes 24, placed in this discharge end of the chamber for the purpose of passing the exhaust gas (or hot air) from the engine, which gas may pass through the entire length of a jacket 25 surrounding the chamber.

Figure 1 shows by arrows the circulation from 25' to 25''.

The jacket 25 may be fed with the heating fluid, for example, water heated by the exhaust, or hot water from the cylinder cooling jacket, or steam.

The regulator or timer 18 is designed to give a regular but intermittent rate of delivery of fuel at each stroke of the engine into the discharge part of the apparatus, where the oil is aerated to the extent desired. For ordinary engines it may be proportioned as an explosion mixture and charged or induced direct into the working cylinder to be compressed and fired in the ordinary way. For engines of the type referred to, having one piston for two working chambers, the carburetor supplies a rich mixture to be delivered for explosion by the air supplied for scavenging purposes.

The regulator or timer 18 is a simple vessel having four separate openings, the inlet in which the hand wheel connected needle valve 16 is fixed for regulating the fuel from the supply tank, and opposite to this the outlet nozzle or jet 23. The other two openings are at the top part of the regulator, and consist of a lower opening 26 (which may be located on one side preferably) having an automatic valve 27, as a ball valve, for admitting air from 19, and an upper opening 28 to an air vessel 29, supplied with air from 19, via valve 27 and opening 26. At the bottom of the regulator 18 is a saucer-like receptacle 30, just below the needle valve 16, but discharging into the outlet 23. The cubic capacity of the air vessel may be varied more or less at will, either mechanically or automatically, and as the nozzle has an area for the maximum possible discharge of oil or spirit, it will be apparent that the oil and air the regulator will contain (the oil in the saucer-like bottom 30) will first be driven out as a spray by the captive air through the nozzle 23, owing to reduced pressure caused by free passage of fuel to cylinder, and then be followed by the captive air. The air vessel 29 will be re-charged from 19 by the higher pressure forced or induced therein by convenient means during the interval of no flow of fuel to cylinder. It is possible during the stroke of the motor for only a part of the captive air to escape by the nozzle 23, owing to the higher pressure in the supply tank. It will therefore follow that the pressure in the air vessel 29 will vary directly as the amount of captive air it will contain and this can be adjusted by the hand wheel 31. Now, as the supply tank is under pressure, it follows that the difference in the pressures in the supply tank and at the outlet of the inlet valve 16 to the regulator, will determine the quantitative rate of delivery of fuel into saucer 30, and as the liquid in the supply tank is subjected to varying pressure, it follows that any variation of pressure in the air vessel 29 of the regulator will appreciably affect the rate of delivery of fuel at each stroke of the engine, by the rise or fall of the pressure in the air vessel 29, so will the quantity of fuel be more or less from the supply tank, so that the discharge can be regulated to a high degree of minuteness. The cubic capacity of the air vessel 29 is varied by means of the plug and hand wheel 31. The hole leading to the nozzle 23 in the saucer or boat-shaped bottom 30 is so arranged that the maximum quantity of fuel required for the charge to the engine will effectually block up the outlet hole of the nozzle, so that at the appointed moment, the air from the air vessel will spray it into the air duct 20, 21, and all or any surplus captive air will follow the discharge fuel.

In summing up the operation of the device, it may be pointed out that the carburetor receives intermittent charges of fuel which are delivered into the chamber 18 from which the fuel is ejected intermittently by reason of the air pressure in 29 and of the pulsations caused by the reciprocating action of the air pump and the suction of the engine pistons. The pressure in the mixing chamber 21 varies according to the revolutions of the engine and when the pressure drops, the air pressure contained within 29 will be in excess of that in 21 and thus force the fuel out of the nozzle 23. When the pressure again rises in 21 owing to the air forced in by the pump connected with 20, the chamber 29 will be recharged through the valve 27 and the air under increased pressure will be held by 29 until the pressure in 21 again drops whereupon the fuel collected in 30 will be forced out through the nozzle 23.

I claim:—

1. A carburetor including a tubular body having a mixing passage, a fuel supply nozzle, and a pressure reservoir communicating with the nozzle and also in valved communication with the mixing passage whereby when the pressure is high in the mixing passage air will enter the reservoir and then escape through the nozzle when the pressure in the mixing passage drops thereby carrying the fuel with it.

2. A carburetor including a tubular jacketed body providing a mixing passage, baffles therein, a fuel supply nozzle within the passage, a pressure reservoir communicating with the nozzle, and a valve adapted to be unseated by pressure in the mixing passage to permit air under pressure to enter the pressure reservoir.

3. A carburetor including a tubular jacketed body having a mixing passage and an air pump connection at one end of the passage, a fuel nozzle axially disposed within the passage, a pressure reservoir communicating with the nozzle, a valve for establishing communication between the mixing passage and the reservoir whereby pressure from the mixing passage may enter the pressure reservoir and a plurality of baffle members within said mixing passage.

In testimony whereof I have affixed my signature hereto this 21st day of January 1921.

LEWIS THOMAS GODFREY-EVANS.